United States Patent
Dhamdhere et al.

(10) Patent No.: US 10,963,349 B2
(45) Date of Patent: Mar. 30, 2021

(54) CONTAINERIZED APPLICATION SNAPSHOTS

(71) Applicant: VMware, Inc., Palo Alto, CA (US)

(72) Inventors: Prashant Dhamdhere, Milpitas, CA (US); Prashima Sharma, Sunnyvale, CA (US); Mark Sterin, Mountain View, CA (US); Sandeep Srinivasa Rao Pissay, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/047,970

(22) Filed: Jul. 27, 2018

(65) Prior Publication Data

US 2019/0065323 A1 Feb. 28, 2019

Related U.S. Application Data

(60) Provisional application No. 62/550,357, filed on Aug. 25, 2017.

(51) Int. Cl.
| | |
|---|---|
| *G06F 12/10* | (2016.01) |
| *G06F 11/14* | (2006.01) |
| *G06F 11/30* | (2006.01) |
| *G06F 9/455* | (2018.01) |
| *G06F 11/34* | (2006.01) |

(52) U.S. Cl.
CPC .......... *G06F 11/1451* (2013.01); *G06F 9/455* (2013.01); *G06F 11/3065* (2013.01); *G06F 11/3452* (2013.01); *G06F 11/3476* (2013.01); *G06F 2201/815* (2013.01); *G06F 2201/84* (2013.01)

(58) Field of Classification Search
CPC .................................................. G06F 11/1451
USPC ......................................................... 711/162
See application file for complete search history.

(56) References Cited

U.S. PATENT DOCUMENTS

| | | | |
|---|---|---|---|
| 2016/0034702 A1* | 2/2016 | Sikka | .................. G06F 9/45558 726/27 |
| 2016/0320978 A1* | 11/2016 | Barve | ...................... G06F 3/065 |
| 2017/0083404 A1* | 3/2017 | Beeken | ............... G06F 11/1451 |

OTHER PUBLICATIONS https://kubernetes.io/docs/tasks/debug-application-cluster/audit/, 6 pages.

(Continued)

*Primary Examiner* — Jae U Yu
(74) *Attorney, Agent, or Firm* — Patterson + Sheridan, LLP

(57) ABSTRACT

Techniques are disclosed that permit storage and availability operations, such as backup and restore, snapshot and cloning, application disaster recovery, and reporting and analytics, to be performed for stateful containerized applications. In one embodiment, a container cluster service is configured to create application instance objects that capture metadata associated with containerized applications and that (optionally) specify scripts to be run before and/or after taking an application consistent snapshot and/or an order in which to take snapshots. Application instances having the configurations specified in the application instance object may then be deployed. In addition, the container cluster service may use an application instance object to create a snapshot of a deployed application instance that includes a point-in-time copy of configuration information specified by the application instance object and reference(s) to snapshot volume(s) created from volume(s) associated with the application instance as part of the snapshot operation.

19 Claims, 5 Drawing Sheets

(56) References Cited

OTHER PUBLICATIONS https://kubernetes.io/docs/concepts/api-extension/custom-resources/, 10 pages.
https://kubernetes.io/docs/tasks/access-kubernetes-api/extend-api-custom-resource-definitions/, 8 pages.
https://github.com/kubernetes/kubernetes/issues/46702, 5 pages.
https://github.com/kubernetes/features/issues/95, 11 pages.

* cited by examiner

CONTAINERIZED APPLICATION SNAPSHOTS

CROSS-REFERENCE TO RELATED APPLICATIONS

This application claims priority to U.S. provisional application having Ser. No. 62/550,357, filed on Aug. 25, 2017, which is hereby incorporated by reference in its entirety.

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and so on to a guest operating system. The virtualization software, also referred to as a "hypervisor," includes one or more virtual machine monitors (VMMs) to provide execution environment(s) for the VM(s). As physical hosts have grown larger, with greater processor core counts and terabyte memory sizes, virtualization has become key to the economic utilization of available hardware.

VMs provide for hardware-level virtualization. Another virtualization technique is operating system-level (OS-level) virtualization, where an abstraction layer is provided on top of a kernel of an operating system executing on a host computer. Such an abstraction is referred to herein as a "container." A container provides for the isolation of a group of processes from others on an operating system. By making use of existing operating system functionality (such as Linux™ name spaces), containers maintain their own private view of the operating system, file system structure, and network interfaces. Containers share the operating system kernel with other processes, but can be constrained to some extent to use an amount of resources such as the central processing unit (CPU), random access memory (RAM), or input/output (I/O) devices. Containers typically have a small system "footprint." That is, containers provide a relatively thin encapsulation layer above and beyond any applications contained therein.

Increasingly, stateful applications are being run in containers, and in particular in container clusters. For example, multiple containers may be created and managed by container orchestrators (e.g., Kubernetes® clusters or Docker® swarm) across a number of VMs and host computers. For containers running in VMs in particular, storage and availability operations, such as backup and restore, snapshot and cloning, application disaster recovery, and reporting and analytics, traditionally require replicating the entire VMs. For example, a backup and restore operation may include replicating a VM with containers running therein and restoring the replicated VM. However, replicating a VM typically includes replicating the state of the guest OS in the VM, contents of the guest OS, as well as well as application (e.g., container) states, applications themselves, and application data, which can be computationally expensive. Further, containers can run anywhere and move from one VM to another, requiring associated application data to move as well between VMs, i.e., the data is not necessarily associated with any particular VM. In addition, VM replication is platform dependent, as VMs cannot be replicated and recovered across different types of hypervisors (e.g., from a vSphere® hypervisor to a Hyper-V™ hypervisor, or vice versa), even though containers running in VMs may be platform agnostic.

SUMMARY

One or more embodiments disclosed herein provide a computer-implemented method. The method generally includes receiving a request to take a snapshot of a containerized application. The method further includes, responsive to receiving the request, generating a snapshot object that includes a point-in-time copy of configuration information associated with the containerized application. In addition, the method includes taking snapshots of one or more data volumes associated with the containerized application; and adding, to the snapshot object, a respective reference to each of the one or more snapshot data volumes.

Further embodiments include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

Embodiments presented herein enable storage and availability operations, such as backup and restore, snapshot and cloning, application disaster recovery, and reporting and analytics, to be performed for stateful containerized applications. In one embodiment, a container cluster service is configured to receive requests for, and to create, application instance objects that capture metadata associated with containerized applications. As used herein, an application instance object refers to a resource object specifying configuration information and/or configuration files that are used (or can be used) to deploy a containerized application. The configuration information in an application instance object (or the configuration files specified therein) may specify components of the application such as services of the application, persistent data volumes, a deployment location, and so on. In addition, the application instance object may specify pre- and post-snapshot scripts to be run prior to and after taking an application consistent snapshot, respectively, and/or an order in which to take the snapshot, among other things.

When the container cluster service receives a request to create a snapshot of an application instance, the container cluster service uses an associated application instance object to create an application snapshot object that includes (1) a point-in-time copy of configuration information from the application instance object, and (2) reference(s) to snapshot volume(s) created from volume(s) associated with the application instance as part of the snapshot operation. The snapshot operation may also be performed in an order specified in the application instance object, and pre- and post-snapshot scripts specified in the application instance object may be run as part of the snapshot operation. Subsequent to creating the application snapshot object, the container cluster service may, at the request of a user, instantiate a new application instance from the application snapshot object. The ability to take snapshots of stateful containerized applications enables various storage and availability operations, such as backup and restore, snapshot and cloning, application disaster recovery, and reporting and analytics, to be performed for containerized applications.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
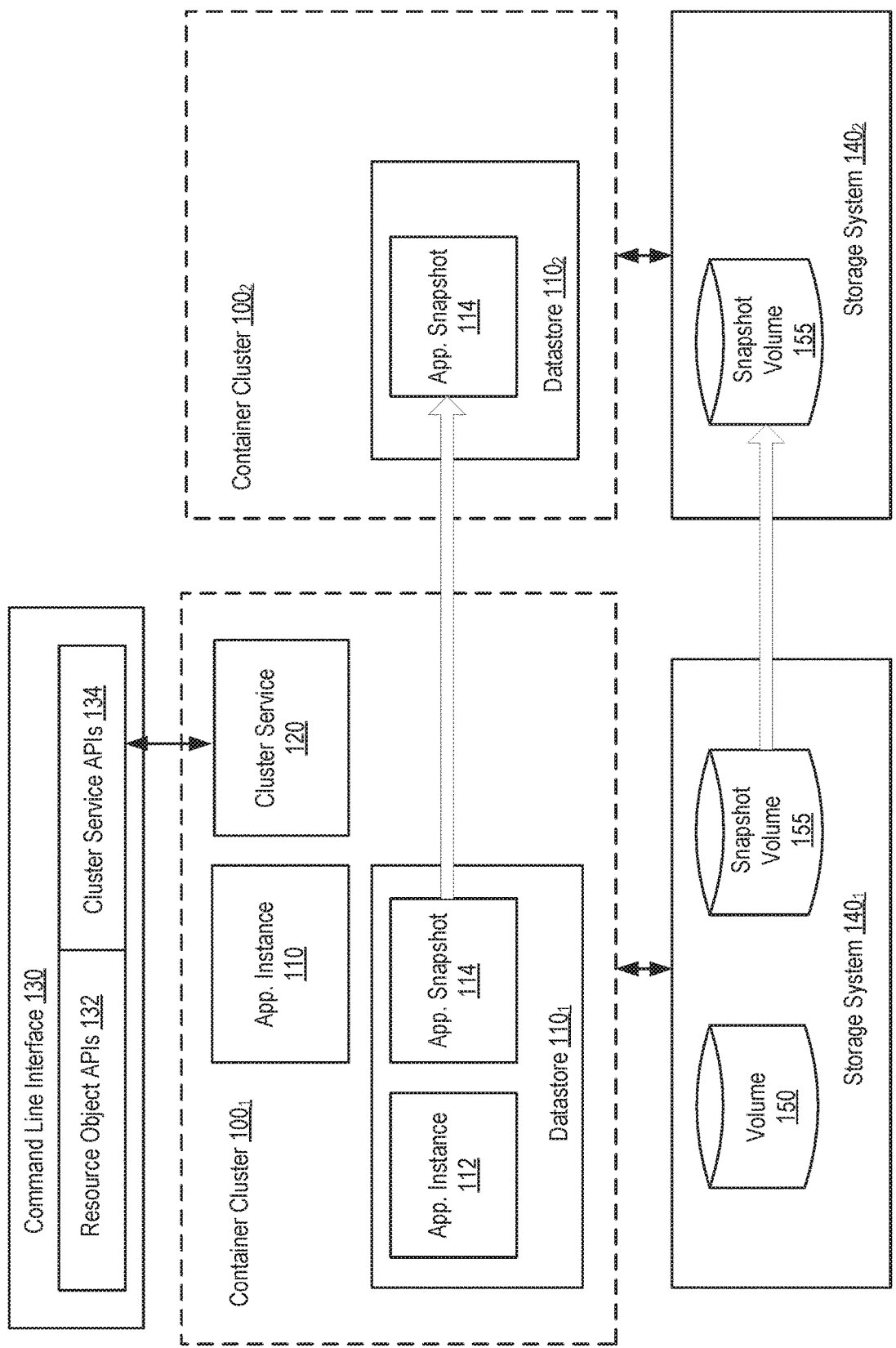
FIG. 1 illustrates an approach for creating a snapshot of a containerized application, according to an embodiment.

FIG. 1 illustrates an approach for creating a snapshot of a containerized application, according to an embodiment. As shown, a container cluster service 120 runs in a container cluster $100_1$, which may include multiple containers running on virtual machines in host computing systems, with the containers being created and managed by a container orchestrator. Container cluster service 120 may be hosted as a stand-alone service in one embodiment, and available as a distributed service. Examples of container orchestrators include the publicly-available Kubernetes® and Docker® swarm. In one embodiment, each container cluster may be a fault domain, such as a data center or a cloud computing system. In such a case, container cluster $100_2$ may include similar components as container cluster $100_1$, but be in a different data center or cloud computing system.

As shown, container cluster service 120 provides cluster service application programming interfaces (APIs) 134 that extend resource object APIs 132 provided by the container orchestrator that manages container cluster $100_1$. APIs 132 may be invoked via, e.g., a command line interface 130, to read from and write to resource objects, while cluster service APIs 134 may be invoked to create and use custom resource objects. Each resource object may generally represent the state of a container cluster, such as containerized applications running therein, resources available to the containerized applications, and policies on how the containerized applications behave. For example, in the case of Kubernetes®, APIs 132 may include the Kubernetes API, which can be used to read from, and write to, resource objects in the Kubernetes API server, while APIs 134 provided by container cluster service 120 may extend the Kubernetes API by permitting the creation and use of custom resource objects. Although container cluster service 120 is shown as running in container cluster $100_1$, it should be understood that similar container cluster service(s) may also be run in other cluster(s) (e.g., container cluster $100_2$) to create and use custom resource objects therein.

In one embodiment, container cluster service 120 is configured to receive requests via APIs 134 for, and to create, application instance objects that are custom resource objects capturing metadata associated with containerized applications. Illustratively, application instance object 112 has been created and stored in a datastore $110_1$, which may be, e.g., a key-value store such as an etcd key-value store. In general, application instance objects may be created for containerized applications that are already running or containerized applications that are to be deployed. Application instance object 112 specifies source configuration information and/or files with configuration information (e.g., .yaml or .json files) used (or to be used) to deploy the corresponding containerized application. Particular configuration information specified by application instance object 112 and/or the configuration files may include components of the application such as services of the application (e.g., a containerized application can include a number of services running in different containers), persistent data volumes, a deployment location such as a container pod, and so on. A user may further add customized information to an application instance object, such as pre- and post-snapshot scripts to run in container(s) prior to and after taking an application consistent snapshot, respectively, and/or an order in which to take such a snapshot, among other things. For example, the pre- and post-snapshot scripts may be used to override certain data or configuration information, and the snapshot order may indicate which service(s) of the application instance to process first during the snapshot.

Illustratively, a containerized application instance 110 has been deployed using application instance object 112. In one embodiment, container cluster service 120 may receive requests via APIs 134 for, and deploy, containerized application instances, such as containerized application instance 110, that have the configuration specified in particular application instance objects, such as application instance object 112. That is, an application instance object represents a containerized application, with some additional metadata such as pre- and post-snapshot scripts, and application instance objects can be used to deploy specific application instances that run in containers. It should be understood that deploying a containerized application may include, e.g., invoking API(s) provided by a container orchestrator that then starts the containers themselves, provisions storage, and so on to effectuate the deployment.

Container cluster service 112 may also receive requests to create a snapshot of an application instance that is running. In turn, container cluster service 112 may use the application instance object to create an application snapshot object, such as snapshot object 114, that includes a point-in-time copy of the corresponding application instance's configuration. Container cluster service 112 may further take a snapshot of volume(s) associated with the application instance, and add to the application snapshot object reference(s) (i.e., a pointer(s)) to the snapshot volume(s). It should be understood that an application instance's configuration may be obtained by invoking API(s) provided by a container orchestrator and the snapshot(s) of the volume(s) taken using, e.g., API(s) provided by a virtualization platform such as vSphere®. In addition, the application snapshot operation may be performed in an order specified in the application instance object, and pre- and post-snapshot scripts specified in the application instance object may be run as part of the snapshot operation.

Application configuration information that is initially specified or referenced in an application instance object may be changed after an application instance is deployed. For example, the network port number that an application service listens to may be changed (e.g., manually), or the size of a data volume used by the application instance may be changed. Such changes may be copied, along with the rest of the application instance's configuration information, from the application instance object to the application snapshot object, providing a point-in-time copy of the application instance's configuration. In addition to configuration information, the application instance's executable(s) and data also need to be captured in the snapshot in order to recreate the application instance. In one embodiment, the executable(s) may be persisted in a registry (e.g., on the Internet) from where they may be downloaded, and the application configuration information that is copied during the snapshot operation may specify what needs to be downloaded from the registry. Further, application data, which is typically stored in data storage volume(s) (e.g., .vmdk file(s)), may also be snapshotted during the application snapshot operation. Illustratively, a snapshot of volume 150 that maintains application instance 110's data in storage system 140$_1$ (which may be, e.g., a shared storage system) has been taken, creating snapshot volume 155.

As an application snapshot object specifies the application instance configuration, data, and executable(s), container cluster service 112 may, at the request of a user, create a new application instance from such a snapshot object. Further, the ability to take snapshots of stateful containerized applications enables storage and availability operations such as snapshotting, cloning, and backup and recovery to be performed for stateful containerized applications. In particular, a user may take a snapshot of an application instance and send a link or copy of the resulting application snapshot object and corresponding snapshot volume(s) to another user, who can then create a new application instance from the snapshot object for analysis and/or troubleshooting purposes. For example, to test a new application feature with production data, a snapshot may be taken of a stateful application running in production and the snapshot object used to deploy a new application instance, with an image having the new feature, from the snapshot object. As another example, to reproduce a bug environment, a snapshot may be taken of a stateful application after bugs have been encountered and the snapshot shared with a developer, who may then clone the application using the shared snapshot and reliably reproduce the environment with bugs. As a further example, to run reporting workloads on a remote or different cluster, a snapshot may be taken of an application to capture the application's data, and the snapshot may then be used to instantiate a new application deployment with the captured data on a different or remote cluster to run reporting workloads, without affecting the original application by running performance-intensive reporting workloads. As yet another example, to run analytics workloads on a remote or different cluster, a snapshot may be taken of the application to capture the application's data at a point in time (e.g., at the end of a day), and the snapshotted application may then be deployed on a different or remote cluster to run analytics workloads (i.e., the captured snapshot may be used to instantiate an analytics related application or workflows), without affecting the original application by running performance-intensive analytics workloads.

Illustratively, application snapshot object 114 and snapshot volume 155 are copied by container cluster service 112 from container cluster 100$_1$ to container cluster 100$_2$ and from storage system 140$_1$ to storage system 140$_2$, respectively. A new application instance having the configuration specified in application snapshot object 114 and data of snapshot volume 155 may then be deployed in container cluster 100$_2$. Application disaster recovery may also be enabled by continuously creating and replicating application snapshot objects and associated physical snapshot volumes to a secondary data center or cloud computing system, from which the applications may be restarted if a primary data center or cloud computing system goes down. The difference between backup and application disaster recovery is that backup snapshots may be taken at specific points in time (e.g., every 12 hours as specified by a user) so that the application can be recovered to those points in time, whereas disaster recovery may require application snapshot objects and corresponding snapshot volumes to be continuously (e.g., every 5 minutes) created and replicated to a secondary data center or cloud computing system.

The application snapshots discussed above can be taken without requiring replication of the VMs in which containerized applications run. Further, application snapshot objects (e.g., application snapshot object 114) are not platform dependent, permitting new application instances to be created across different types of hypervisors. For example, container cluster 100$_1$ may include containers running in VMs on a vSphere® platform, while container cluster 100$_2$ may include containers running in VMs on a Hyper-V™ platform.

Figure 2:
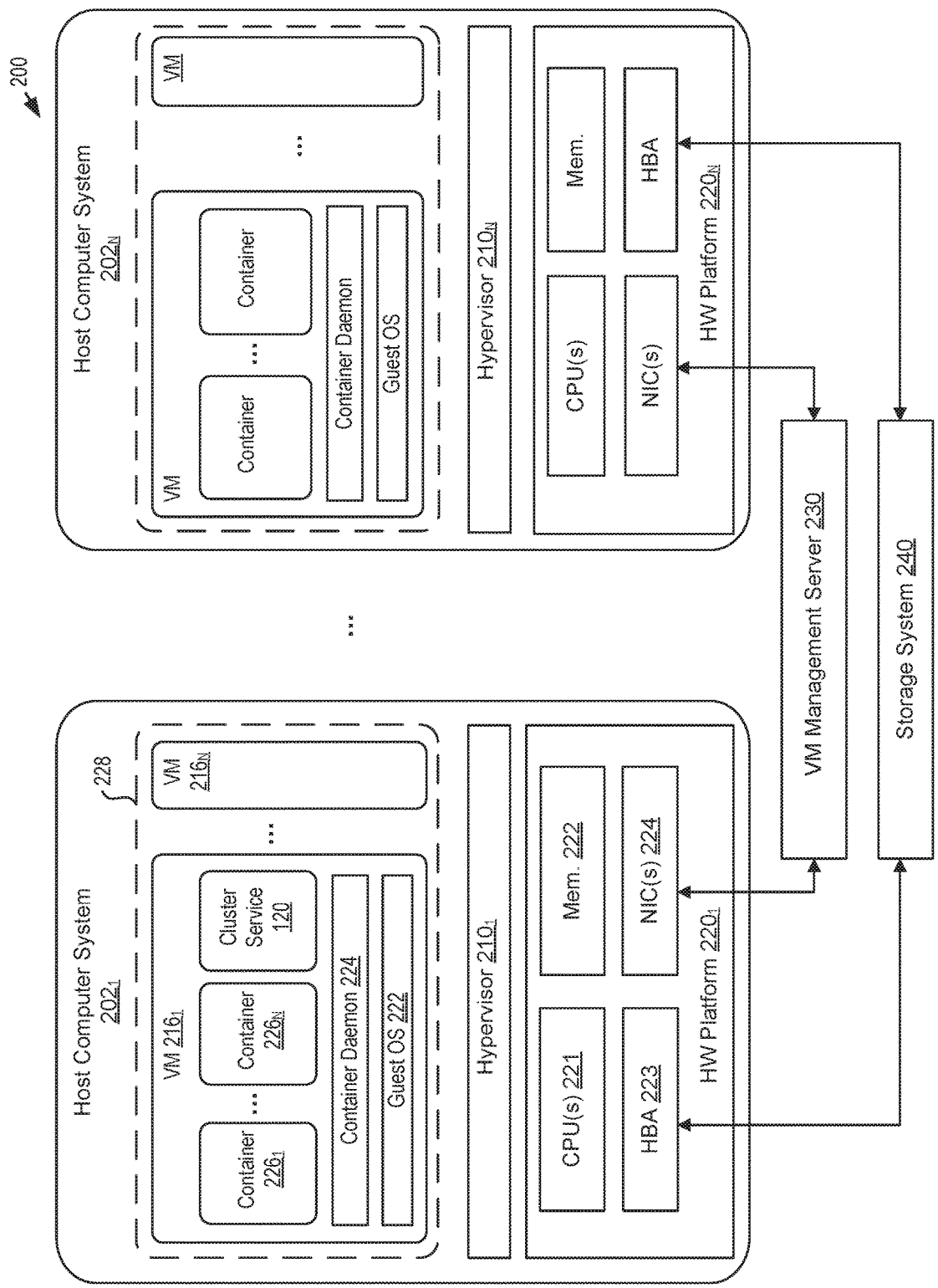
FIG. 2 illustrates a system with which one or more embodiments may be utilized.

FIG. 2 illustrates a system 200 with which one or more embodiments may be utilized. As illustrated, system 200 includes host computers 202$_{1-N}$. In general, one or more host computers 202 may be arranged in an interconnected server system such as a data center or cloud. Each of the host computers 202$_{1-N}$ is configured to provide a virtualization layer that abstracts computing resources of a hardware platform into multiple virtual machines (VMs) (e.g., VMs 216$_{1-N}$) that run concurrently on the same host. Illustratively, hardware platform 220$_{1-N}$ of host 202$_1$ includes CPU 221, memory 222, host bus adapter (HBA) 223, networking interface 224, and other conventional components of a computing device. VMs 216$_{1-N}$ run on top of hypervisor 210$_1$ that enables sharing of the hardware resources of host 202 by the virtual machines. One example of hypervisor 210$_1$ that may be used in an embodiment described herein is a VMware ESXi™ hypervisor provided as part of the VMware vSphere® solution made commercially available from VMware, Inc. of Palo Alto, Calif. Hypervisor 210$_1$ provides a device driver layer configured to map physical resource of hardware platforms 220 to "virtual" resources of each VM 216$_i$ such that each VM 216$_i$ has its own corresponding virtual hardware platform. Each such virtual hardware platform 220 provides emulated hardware (e.g., memory, processor, storage, network interface, etc.) that may, for example, function as an equivalent, conventional hardware architecture for its corresponding VM. Virtual hardware platforms 220$_{1-N}$ may be considered part of virtual machine monitors (VMMs) which implement virtual system support to coordinate operations between hypervisor 210$_1$ and corresponding VMs 216$_{1-N}$.

Hypervisor 210$_1$ may run on top of a host operating system of host 202$_1$ or directly on hardware components of host 202$_1$. Further, each VM 216$_1$ includes a guest operating system (e.g., guest OS 222) such as Microsoft Windows® or Linux™, and one or more guest applications and processes running on top of the guest operating system.

As shown, each VM 216$_1$ includes a container daemon (e.g., container daemon 224 in VM 216$_1$) installed therein and running as a guest application under control of the guest OS. Container daemons are processes that enable the deployment and management of containers by providing a layer of operating-system-level virtualization on the guest OS within the VM. Containers themselves are software instances that enable virtualization at the operating system level. Each VM $216_1$ is configured to run one or more containers 226 therein. A container 126 may be instantiated on a VM by a container daemon 224 running therein. Each container (e.g., container $226_1$) runs as an isolated process in userspace on a guest OS, sharing the kernel of the guest OS with other virtual containers. Each of containers $226_{1-N}$ may be a package (sometimes referred to as an "image") of pre-installed application code and any binaries and libraries used for the execution of that application code to create a virtualized application. In some cases, a container may be a blank image into which applications may be installed or launched within.

In the case of container clusters such as clusters $100_1$-$100_2$ described above with respect to FIG. 1, container orchestrators (not shown), also referred to as container orchestration tools, may run in system 200 to manage containers across the infrastructure. Container orchestrators generally allow a user to deploy, scale, upgrade, remove, or otherwise manage containers, thereby simplifying container management and providing a framework for defining initial container deployment plus the ability to manage multiple containers. Example container orchestrators include those of the publicly-available Kubernetes®, Docker Swarm®, OpenShift®, Cloud Foundry®, and Mesos®. For example, Kubernetes® is typically implemented with master components that can run in any cluster node, providing the container cluster's control plane, making global decisions about the cluster, and detecting and responding to cluster events, as well as node components that run on every node of the container cluster, maintain running pods, and provide the Kubernetes® runtime environment.

Computing system 200 further includes virtualization management module 230 that may communicate with host computers $202_{1-N}$. Virtualization management module 230 is configured to carry out administrative tasks for computing system 200, including managing hosts $202_{1-N}$, managing VMs running within each of hosts $202_{1-N}$, provisioning VMs, migrating VMs from one host to another host, and load balancing between hosts $202_{1-N}$. In one embodiment, virtualization management module 230 is a computer program that resides and executes in a central server, which may reside in computing system 200, or alternatively, virtualization management module 230 may run as a VM in one of hosts $202_{1-N}$. One example of virtualization management module 230 is the vCenter Server® product made available from VMware, Inc.

Computing system 100 further includes a storage system 240, which in one embodiment is a shared storage that is accessible, e.g., through the host bus adapters (e.g., HBA 223) of host computer systems $200_{1-N}$. In a particular embodiment, storage system 240 may be a vSAN™ storage platform, which uses server-based disk drives and flash devices to create its own shared pool of storage and provides high availability, among other things. It should be understood, however, that techniques disclosed herein may also be applied to other types of storage systems, such as network attached storage (NAS) storage systems.

Illustratively, container cluster service 120 runs in a container in VM $216_1$, which itself runs in host computer system $202_1$. As described, container cluster service 120 is configured to receive requests for, and to create, application instance objects that can be used to deploy application instances having particular application configurations, as well as to take snapshots of application instances that may themselves be used to deploy new application instances. Further, the ability to take snapshots of stateful containerized applications enables various storage and availability operations such as snapshotting, cloning, and backup and recovery of stateful containerized applications.

Figure 3:
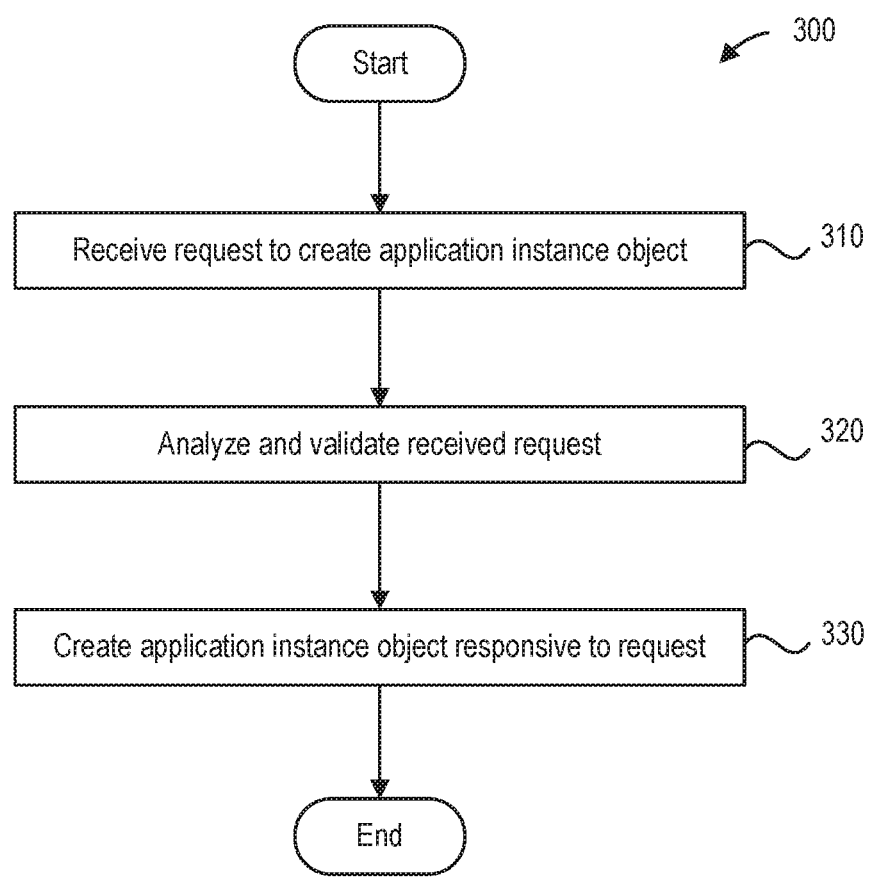
FIG. 3 illustrates a method of creating an application instance object for an application that is running, according to an embodiment.

FIG. 3 illustrates a method 300 of creating an application instance object for an application that is running, according to an embodiment. As shown, method 300 begins at step 310, where container cluster service 120 receives a request to create an application instance object. In one embodiment, a user requests the creation of an application instance object by creating a resource object that specifies source configuration files used to deploy the application, pre- and post-snapshot scripts to be run in container(s), and a snapshot order. Such a resource object that the user creates is also referred to herein as an application instance request object and, as discussed in greater detail below, container cluster service 120 may create an application instance object in response to the application instance request object. For example, in the case of Kubernetes®, the user may create a Kubernetes object that specifies source configuration files such as a collection of manifest files, helm chart release name and values, or the contents of a manifest file, as well as pre- and post-snapshot scripts and a snapshot order. In order to request creation of an application instance of "app-1," for example, the user may invoke cluster service APIs 134 to create an "AppInstanceReq" Kubernetes object, and the request may include an object specification such as that shown in Table 1 in a body of the request. In such a case, container cluster service 120 may listen for such a request to create the application instance of "app-1."

TABLE 1 apiVersion: "juno.vmware.com/v1"
kind: AppInstanceReq
metadata:
    name: app-1
spec:
    # Specify the location of the cluster where the application is running or
    to be deployed
    cluster:
        name: "k8s-1"
        namespace: # Infer "default" namespace when not specified
    # Indicates the operation the user wants to perform. Allowed options are
    import/deploy/update/delete
    operationType: create
    # Use one of appConfigFiles or appConfigContent or helmChart
    source:
        # Provide the list of yaml/json files used to deploy the application
        appConfigFiles:
        - http://pa-dbc1102.eng.vmware.com/ssrinivas/Demo/Juno/app-deploy.yaml
        - http://pa-dbc1102.eng.vmware.com/ssrinivas/Demo/Juno/app-deploy2.yaml TABLE 1-continued

```
# Provide the yaml/json content
#appConfigContent: <content>
# Provide helm chart or release
#helm:
# name: "minio:v1"
# values-config: "http://pa-dbc1102.eng.vmware.com/ssrinivas/minio-
values.yaml"
# Optionally specify the pre/post scripts to be run before/after snapshot
operation
# to take app consistent snapshots.
scripts:
- container-prefix: mysql
        post-script: "/etc/vmware/mysql-post-script.sh\n"
        pre-script: "/etc/vmware/mysql-pre-script.sh\n"
# "strict" indicates that the snapshot operation fails if any of the
pre/post script fails
# "weak" indicates that the snapshot operation will not fail if any of
the pre/port script fails
snapshotEnforcement: "strict"
# Specify the order in which the snapshot should be taken.
snapshotOrder:
- mysql
```

In one embodiment, container cluster service 120 may continuously listen for object addition, modification, and deletion operation requests in particular namespaces, such as per-user namespaces or per-team namespaces used for role-based access control (RBAC). In the one namespace per user case, an administrator may assign all privileges (full control) to a namespace to one user, and any object created in one user's namespace will not be visible to another user, unless the object is explicitly shared. In the one namespace per team case, an administrator may assign all privileges (full control) to a namespace to a team including multiple users, and any object created in one team's namespace will not be visible to another team, unless the object is explicitly shared. However, the users within a team may be allowed to modify each other's objects.

Although method 300 is described with respect to creating an application instance object for an application that is already running, it should be understood that container cluster service 120 may also receive a request to deploy an instance of an application that is not yet running. For example, the user may invoke cluster service APIs 134 and include an object specification in the API request with contents similar to that of Table 1, except the "operationType" is changed to "deploy," in order to create a Kubernetes object requesting deployment of an application instance.

At step 320, container cluster service 120 analyzes and validates the request received at step 310. In one embodiment, this step may include analyzing the request to determine that the operation type is "create," indicating that the operation to be performed is creation of an application instance object, as well as validating contents of the request such as the object specification therein, among other things. The validation of the input request is performed before triggering internal tasks, and if the input is determined to be incorrect by logic in container cluster service 120, then no further action is taken.

Then, at step 330, container cluster service 120 creates an application instance object responsive to receiving the request. Continuing the Kubernetes® example from above, container cluster service 120 may create the application instance object by invoking cluster service APIs 134 and including an object specification such as that shown in Table 2 in a body of the API request.

TABLE 2

```
apiVersion: "juno.vmware.com/v1"
kind: AppInstance
    metadata:
name: app-1
spec:
    # Location where the application is running or to be deployed cluster:
        name: "k8s-1"
        namespace: default
# Use one of appConfigFiles or appConfigContent or helmChart source:
    # Provide the list of yaml files used to deploy the application
    appConfigFiles:
    - http://pa-dbc1102.eng.vmware.com/ssrinivas/Demo/Juno/app-deploy.yaml
    - http://pa-dbc1102.eng.vmware.com/ssrinivas/Demo/Juno/app-deploy2.yaml
    # The pre/post scripts to be run before/after snapshot operation
    # to take app consistent snapshots.
    scripts:
    - container-prefix: minio
            post-script: "/etc/vmware/minio-post-script.sh\n"
            pre-script: "/etc/vmware/minio-pre-script.sh\n"
    # "strict" indicates that the snapshot operation fails if any of the
    pre/post script fails
    # "weak" indicates that the snapshot operation will not fail if any of
    the pre/port script fails
    snapshotEnforcement: "weak"
```

TABLE 2-continued

```
# Specify the order in which the snapshot should be taken.
snapshotOrder:
- minio
# System generated status field
status:
    phase: "success" # pending/success/failed
    error: ""
```

In one embodiment, a task manager module in container cluster service 120 may first create the application instance object but mark its status as "pending." The task manager may then schedule a task to run that updates the application instance object's status to "in progress," performs any appropriate additional validation steps, and then updates the application instance object's status to "success" if the validation is successful.

Figure 4:
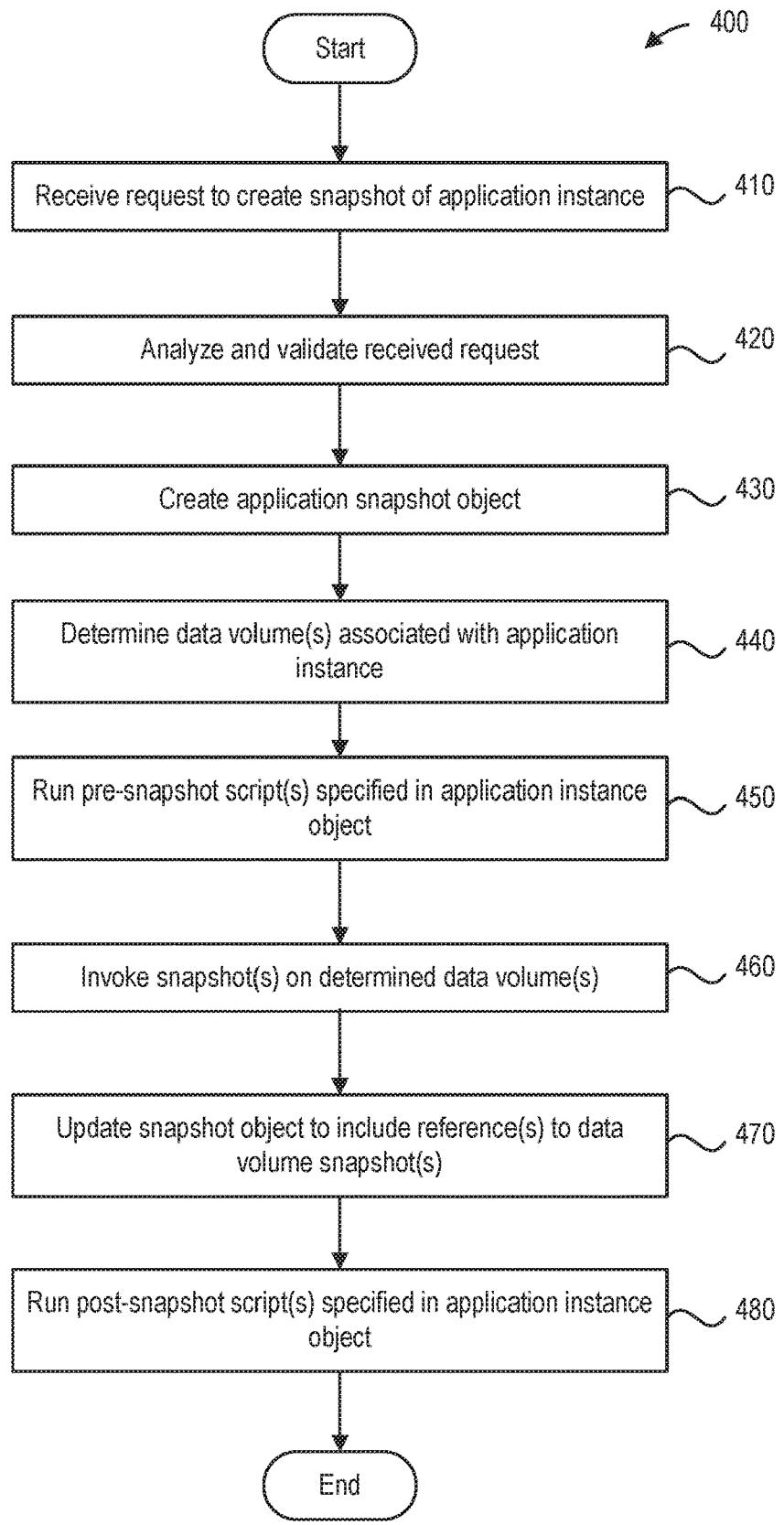
FIG. 4 illustrates a method for taking a snapshot of an application instance, according to an embodiment.

FIG. 4 illustrates a method 400 for taking a snapshot of an application instance, according to an embodiment. As shown, method 400 begins at step 410, where container cluster service 120 receives a request to create a snapshot of the application instance. Similar to step 310 of method 300, a user may request the creation of an application instance snapshot by creating a resource object, such as a Kubernetes object, that requests the snapshot of a particular application instance. Such a resource object that the user creates to request the snapshot is also referred to herein as an application snapshot request object and, as discussed in greater detail below, container cluster service 120 may create an application snapshot object in response to the application snapshot request object. For example, in order to request the creation of a snapshot of "app-1," the user may invoke APIs 134 with a configuration file in a body of the request that includes contents such as that of Table 3 to create an "AppSnapshotReq" Kubernetes object. In such a case, container cluster service 120 may listen for such a request to create the snapshot of "app-1".

TABLE 3

```
apiVersion: "juno.vmware.com/v1"
kind: AppSnapshotReq
metadata:
    name: snap-app-1
spec:
    description: "Snapshot for dev1 to debug bug 33456"
    appInstanceName: "app-1"
    namespace: "default
```

At step 420, container cluster service 120 analyzes and validates the received request. In one embodiment, this step may include analyzing the request to determine that the request is for a new snapshot, as well as validating contents of the request such as the object specification therein, and that the user making the request is authorized to access objects related to the snapshot operation. To determine whether the user making the request is an authorized user in particular, container cluster service 120 may, e.g., identify the user who created the snapshot request resource object using Kubernetes audit logs indicating the user involved in the creation, and then attempt to access (e.g., via a get operation) the application instance as that user. Audit logs provide a security-relevant chronological set of records of activities that have affected the system by individual users, administrators, and other system components. The attempt to impersonate the user will either succeed, indicating the user is authorized to access the application instance, or fail, indicating the user is not authorized to access the application instance.

At step 430, container cluster service 120 creates an application snapshot object. The application snapshot object that is created may include application configuration information obtained from the corresponding application instance object by, e.g., invoking API(s) provided by a container orchestrator. For example, the obtained configuration information may include an application name, state, storage use, properties of a storage application, and so on. As described, the application configuration information initially specified or referenced in the application instance object may be changed after the application instance is deployed. For example, the network port number that an application service listens to may be changed (e.g., manually), or the size of a data volume associated with the application instance may be changed. Such changes may be copied, along with the rest of the application instance's configuration, to the snapshot object, providing a point-in-time copy of the application instance's configuration. For example, the configuration information may specify the particular application (e.g., MongoDB), the state of the application, the storage use, properties of the storage application, and so on. As described, the application instance's executable(s) and data are also captured in the snapshot in order to recreate the application instance. In one embodiment, the executable(s) may be persisted in a registry from where they may be downloaded, and the application configuration information that is copied during the snapshot operation may specify what needs to be downloaded from the registry. The data of the application may be captured by determining data volume(s) associated with the application instance and taking snapshots of those data volume(s), as discussed in greater detail below.

In one embodiment, a task manager module in container cluster service 120 may first create the application snapshot object at step 430 but mark its status as "pending." The task manager may then schedule a task that container cluster service 120 runs to perform steps 440-480, described below. When such a task is run, container cluster service 120 may update the snapshot object status to "in progress."

At step 440, container cluster service 120 determines data volume(s) associated with the application instance to snapshot. In one embodiment, container cluster service 120 parses configuration information that is stored for the application instance specified in the snapshot request to identify data volume(s) therein to snapshot.

At step 450, container cluster service 120 runs pre-snapshot script(s) specified in an application instance object. As described, the application instance object corresponding to an application instance may specify pre- and post-snapshot script(s) to run in container(s), as well as an order in which a snapshot should be taken. In one embodiment, container cluster service 120 may run such pre-snapshot script(s) specified in the application instance object prior to taking the snapshot itself. The application instance object may further specify strict or weak enforcement, with strict enforcement indicating that the snapshot operation fails if any pre- or post-snapshot script fails and weak enforcement indicating that the snapshot operation will not fail if any pre- or post-snapshot script fails. In such a case, if any of the pre-snapshot script(s) fail, container cluster service 120 may either fail the snapshot operation or capture the failure information and continue, depending on whether enforcement is strict or weak, respectively.

Then, at step 460, container cluster service 120 takes snapshot(s) of the determined data volume(s). In one embodiment, container cluster service 120 may first connect to the container cluster where the application instance is running, as specified in the application instance object, and then invoke snapshot(s) on the data volume(s) associated with the application instance as determined at step 440. Techniques are known for taking snapshots of data volumes such as .vmdk files, and such techniques may be employed to take the snapshot(s) at step 460 in some embodiments. For example, a virtualization platform such as vSphere® may provide API(s) that can be invoked to take snapshots of the data volume(s).

At step 470, container cluster service 120 updates the snapshot object created at step 430 to include reference(s) to the data volume snapshot(s). Continuing the Kubernetes® example above, the updated snapshot object may include contents such as that shown in the example creation of an AppSnapshot object in Table 4.

TABLE 4

```
apiVersion: "juno.vmware.com/v1"
kind: AppSnapshot
metadata:
    name: snap-app-1
spec:
    description: "Snapshot for dev1"
    appInstanceName: "app-1"
    snapshotState:
#captures the state of the app
appState:
    appContent: |
        kind: StorageClass
        apiVersion: storage.k8s.io/v1
        metadata:
            name: fast
        provisioner: kubernetes.io/vsphere-volume
        parameters:
            diskformat: zeroedthick
        ---
        apiVersion: v1
        kind: Service
        metadata:
            name: wordpress-mysql
            labels:
                app: wordpress
        spec:
            ports:
            - port: 3306
            selector:
                app: wordpress
                tier: mysql
            clusterIP: None
        ---
        apiVersion: v1
        kind: PersistentVolumeClaim
        metadata:
            name: mysql-pv-claim
            annotations:
                volume.beta.kubernetes.io/storage-class: fast
            labels:
                app: wordpress
        spec:
            accessModes:
            - ReadWriteOnce
```

TABLE 4-continued

```
            resources:
                requests:
                    storage: 20Gi
        ---
        apiVersion: extensions/v1beta1
        kind: Deployment
        metadata:
            name: wordpress-mysql
        labels:
            app: wordpress
        spec:
            strategy:
                type: Recreate
            template:
                metadata:
                    labels:
                        app: wordpress
                        tier: mysql
                spec:
                    containers:
                    - image: mysql:5.6
                        name: mysql
                        env:
                        - name: MYSQL_ROOT_PASSWORD
                            value: mysqlpassword
                        ports:
                        - containerPort: 3306
                            name: mysql
                        volumeMounts:
                        - name: mysql-persistent-storage
                            mountPath: /var/lib/mysql
                    volumes:
                    - name: mysql-persistent-storage
                        persistentVolumeClaim:
                            claimName: mysql-pv-claim
scripts:
- container-prefix: mysql
    post-script: "/etc/vmware/mysql-post-script.sh\n"
    pre-script: "/etc/vmware/mysql-pre-script.sh\n"
snapshotEnforcement: "strict"
snapshotOrder:
- mysql
snapshotDisks:
    pvc: "mysql-pv-claim"
    snapshotRef: "snapshot-ref-1"
#System generated status field
status:
    phase: "success" # pending/success/failed
    error: ""
```

At step 480, container cluster service 120 runs post-snapshot script(s) specified in the application instance object. Similar to the discussion above with respect to step 450, if any of the post-snapshot script(s) fail, container cluster service 120 may either fail the snapshot operation or capture the failure information and continue, depending on whether an enforcement specified in the application instance object is strict or weak, respectively.

Figure 5:
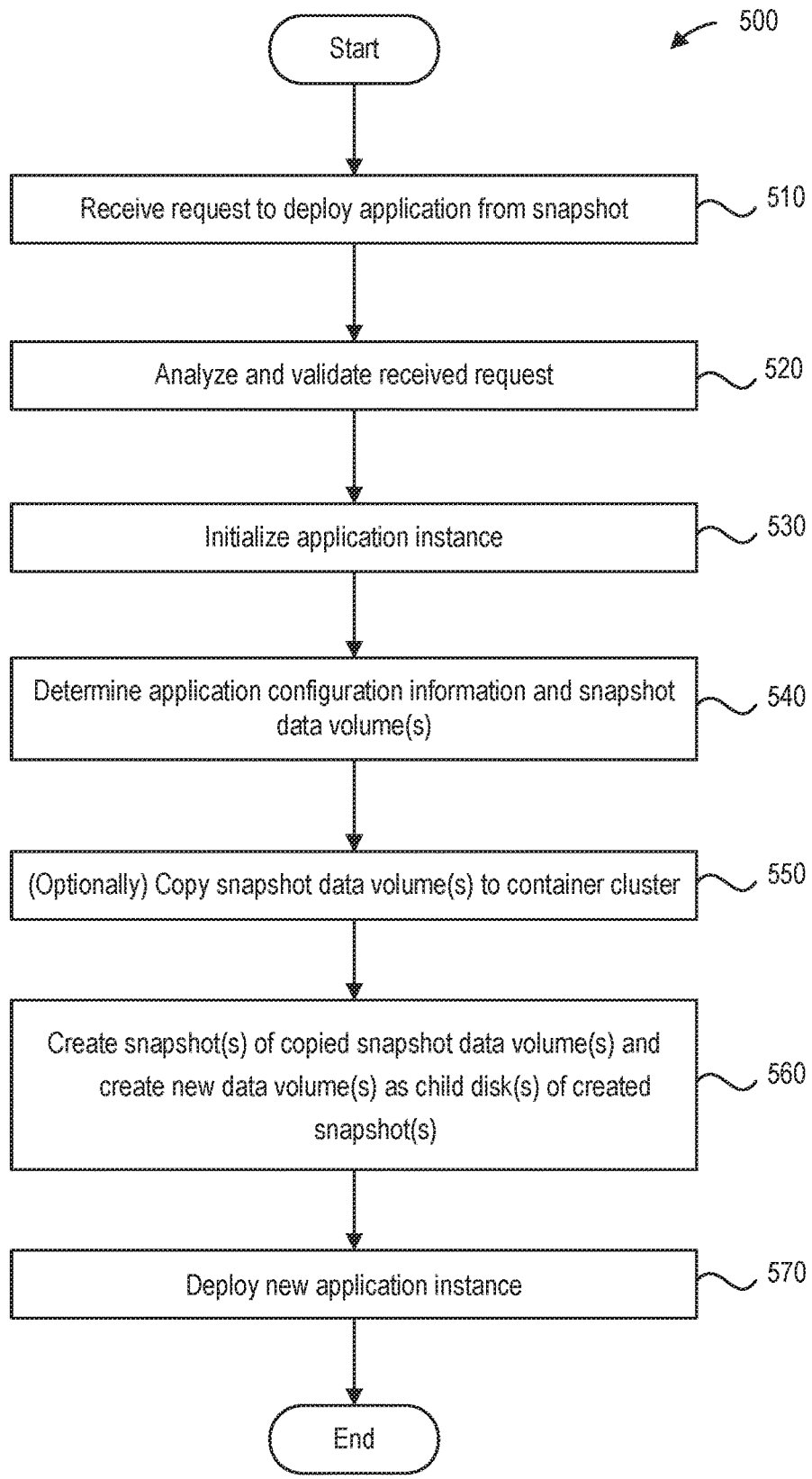
FIG. 5 illustrates a method for deploying an application instance from an application snapshot, according to an embodiment.

FIG. 5 illustrates a method 500 for deploying an application instance from an application snapshot object, according to an embodiment. It is assumed that the application snapshot object has already been created, such as via the steps of method 400, described above. As shown, method 500 begins at step 510, where container cluster service 120 receives a request to deploy an application instance from the application snapshot object. Similar to step 310 of method 300, a user may request deployment of an application instance from an application snapshot object by creating a resource object, such as a Kubernetes® object, that requests deployment of the application instance from the application snapshot object, and container cluster service 120 may listen for such a request. The resource object that the user creates may further (1) include configuration information (e.g., a .yaml file) for the application to be instantiated, and (2)

indicate how the new application's data volume(s) map to the snapshot data volume(s) from the source application.

At step 520, container cluster service 120 analyzes and validates the received request. Similar to step 420, step 520 may include analyzing the request to determine that the request is for creating a new application instance from a snapshot, as well as validating contents of the request, such as the object specification therein, and that the user making the request is authorized to access the snapshot object (e.g., by attempting to access the snapshot object as that user), among other things.

At step 530, container cluster service 120 initializes an application instance object. In one embodiment, a task manager module in container cluster service 120 may first create the application instance object but mark its status as "pending." The task manager may then schedule a task to run that updates the application instance object's status to "in progress," performs steps 540-570 below, and then updates the application instance object's status to "success" if the application instance object is successfully created.

At step 540, container cluster service 120 determines application configuration information and snapshot data volume(s) for the application instance. In one embodiment, container cluster service 120 reads the application snapshot object referenced in the resource object, described above, that requests deployment of the application instance, in order to determine the application configuration information, the volume snapshot(s) in the container cluster, and the actual data volume(s) (e.g., the .vmdk file(s)).

At step 550, container cluster service 120 optionally copies the snapshot data volume(s) determined at step 540 to a target container cluster. This assumes the snapshot data volume(s) need to be copied to the target container cluster so as to be accessible to the application instance being deployed.

At step 560, container cluster service 120 takes snapshot(s) of the copied snapshot data volume(s) and creates, for each snapshot that is taken, a new data volume for the application instance being deployed as a child disk of the snapshot that is taken. That is, a linked clone is created for each snapshot, with the snapshot of the copied data volume as a parent disk and the application's new data volume as a child disk. As used herein, a "linked clone" is a duplicate of a parent VM that uses the same base disk as the parent VM, with a chain of "redo logs" (also known as "delta disks") to track the differences between the parent VM and the linked clone. By contrast, a full clone is an independent copy of the parent VM that shares nothing with the parent VM after the cloning operation. In an alternative embodiment, a full clone of each copied snapshot data volume may be created rather than a linked clone at step 560.

At step 570, container cluster service 120 deploys the new application instance. Such a deployment of the new application instance may include container cluster service 120 connecting to the target container cluster and deploying the application instance therein, as well as mounting and using the new data volume(s) created at step 560. As described, deploying a containerized application may generally include invoking API(s) provided by, e.g., a container orchestrator that then starts the containers themselves, provisions storage, and so on to effectuate the deployment. In one embodiment, a request may be made for an application instance and steps similar to method 300, described above, performed to deploy the application instance. For example, container cluster service 120 may make a request for an application instance that includes the application configuration information determined at step 540 and a reference to the new data volume(s) created at step 560, such as an application instance request that includes in a body of the request the object specification shown in Table 5.

TABLE 5

```
apiVersion: "juno.vmware.com/v1"
kind: AppInstanceReq
metadata:
    name: app-1-copy
spec:
# Specify the location of the cluster where the application is running or
to be deployed
cluster:
    name: "k8s-2"
    namespace: # Infer "default" namespace when not specified
# Specify appConfigContent and appSnapshot
source:
    # Provide the customized yaml/json content
    appConfigContent: |
    kind: StorageClass
    apiVersion: storage.k8s.io/v1
    metadata:
        name: fast
    provisioner: kubernetes.io/vsphere-volume
    parameters:
    diskformat: zeroedthick
    ---
    apiVersion: v1
    kind: Service
    metadata:
        name: wordpress-mysql-copy
        labels:
            app: wordpress-copy
    spec:
        ports:
        - port: 4406
        selector:
            app: wordpress-copy
            tier: mysql-copy
        clusterIP: None
    ---
    apiVersion: v1
    kind: PersistentVolumeClaim
    metadata:
        name: mysql-pv-claim-copy
        annotations:
            volume.beta.kubernetes.io/storage-class: fast
        labels:
            app: wordpress-copy
    spec:
        snapshotReq: "snapshot-ref-1" # This refers to the snapshot
        request object in source cluster
        accessModes:
        - ReadWriteOnce
        resources:
            requests:
                storage: 20Gi
    ---
    apiVersion: extensions/v1beta1
    kind: Deployment
    metadata:
        name: wordpress-mysql-copy
        labels:
            app: wordpress-copy
    spec:
        strategy:
            type: Recreate
        template:
            metadata:
                labels:
                    app: wordpress-copy
                    tier: mysql-copy
            spec:
                containers:
                - image: mysql:5.6
                    name: mysql
                    env:
                    - name: MYSQL_ROOT_PASSWORD
                        value: mysqlpassword
```

TABLE 5-continued

```
            ports:
              - containerPort: 3306
                name: mysql
            volumeMounts:
              - name: mysql-persistent-storage
                mountPath: /var/lib/mysql
      volumes:
      - name: mysql-persistent-storage
        persistentVolumeClaim:
                claimName: mysql-pv-claim-copy
appSnapshot: # Provide the snapshot reference from which to copy
    snapshotName: "snap-app-1"
```

Although described herein primarily with respect to containerized applications running in VMs, techniques disclosed herein may also be practiced independently of VMs. That is, in some embodiments, containerized applications may run in physical computing systems rather than VMs, or in a combination of physical computing systems and VMs.

Although described herein primarily with respect to a single container cluster service 120, it should be understood that multiple replicas of such a service may be deployed in other embodiments for scaling purposes. In one embodiment, one replica service may be elected as a leader that is responsible for scheduling tasks across multiple replicas.

Although described herein primarily with respect to the creation of application instance and snapshot objects, it should be understood that the created objects may also be deleted. For example, to delete an application instance or snapshot object, a user may mark a corresponding request object for deletion (e.g., by setting an operation type to "delete"), and container cluster service 120 may in turn delete both the request object and the application instance or snapshot object, as well as corresponding disks representing the snapshot and/or the application itself, as appropriate.

Although described herein primarily with respect to operations such as creating an application instance, taking a snapshot of an application instance, etc., it should be understood that users may invoke different operations (e.g., a creation and a deletion request) on the same object, requiring concurrency handling. For such concurrency handling, running container cluster service 120 tasks may, in one embodiment, acquire read and/or write locks to block accesses to the same objects by other tasks until the locks are released.

Advantageously, techniques disclosed herein permit snapshots of stateful containerized applications to be taken without requiring the computationally expensive replication of the VMs in which the containerized applications run. Such snapshots of stateful containerized applications enable various storage and availability operations to be performed for the stateful containerized applications, such as backup and restore, snapshot and cloning, application disaster recovery, and reporting and analytics. Further, the snapshots described herein are not platform dependent and can be recovered across different types of hypervisors (e.g., vSphere® and Hyper-V™ hypervisors).

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and so on.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, NAS, read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer-implemented method for copying a containerized application deployed in a first container cluster to a second container cluster, the method comprising:
   receiving a request to take a snapshot of a containerized application;
   responsive to receiving the request, generating a snapshot object that includes a point-in-time copy of configuration information associated with a state of the containerized application as deployed in the first container cluster;
   taking snapshots of one or more data volumes associated with the containerized application, the one or data volumes stored in a first storage resource;
   adding, to the snapshot object, a respective reference to each of the one or more snapshot data volumes;
   copying the snapshot object to the second container cluster; and
   copying the snapshots of one or more data volumes to a second storage resource associated with the second container cluster.

2. The method of claim 1, wherein the configuration information is copied from an application instance object specifying the configuration information and configuration files used to deploy the containerized application.

3. The method of claim 2, wherein the application instance object specifies at least one of services of the containerized application, the one or more data volumes associated with the containerized application, or a deployment location of the containerized application.

4. The method of claim 2, wherein the application instance object further specifies at least one of a pre-snapshot script that is run prior to copying the one or more data volumes or a post-snapshot scripts that is run after adding, to the snapshot object, the respective reference to each of the one or more snapshot data volumes.

5. The method of claim 2, wherein the application instance object further specifies a snapshot order indicating one or more services of the containerized application to process prior in time to another service while generating the snapshot object.

6. The method of claim 1, further comprising, instantiating a new instance of the containerized application in the second container cluster using the snapshot object and the one or more snapshot data volumes.

7. The method of claim 6, wherein instantiating the new instance of the containerized application includes:
   determining the point-in-time copy of the configuration information and the one or more snapshot data volumes using the snapshot object;
   creating at least one of a linked clone or a full clone of each of the one or more snapshot data volumes; and
   deploying the new instance of the containerized application using the determined point-in-time copy of the configuration information and the linked clones or the full clones of the one or more snapshot data volumes.

8. The method of claim 1, further comprising validating the received request by:
   identifying a user who made the request; and
   attempting to access the containerized application as the identified user.

9. The method of claim 1, wherein the generated snapshot object and the one or more snapshot data volumes are used in at least one of a backup and restore, cloning, disaster recovery, reporting, or analytics operation.

10. A non-transitory computer-readable storage medium storing instructions, which when executed by a computer system, cause the computer system to perform operations for copying a containerized application deployed in a first container cluster to a second container cluster, the operations comprising:
    receiving a request to take a snapshot of a containerized application;
    responsive to receiving the request, generating a snapshot object that includes a point-in-time copy of configuration information associated with a state of the containerized application as deployed in the first container cluster;
    taking snapshots of one or more data volumes associated with the containerized application, the one or data volumes stored in a first storage resource;
    adding, to the snapshot object, a respective reference to each of the one or more snapshot data volumes;
    copying the snapshot object to the second container cluster; and
    copying the snapshots of one or more data volumes to a second storage resource associated with the second container cluster.

11. The computer-readable storage medium of claim 10, wherein the configuration information is copied from an application instance object specifying the configuration information and configuration files used to deploy the containerized application.

12. The computer-readable storage medium of claim 11, wherein the application instance object specifies at least one of services of the containerized application, the one or more data volumes associated with the containerized application, or a deployment location of the containerized application.

13. The computer-readable storage medium of claim 11, wherein the application instance object further specifies at least one of a pre-snapshot script that is run prior to copying the one or more data volumes or a post-snapshot scripts that is run after adding, to the snapshot object, the respective reference to each of the one or more snapshot data volumes.

14. The computer-readable storage medium of claim 11, wherein the application instance object further specifies a snapshot order indicating one or more services of the containerized application to process prior in time to another service while generating the snapshot object.

15. The computer-readable storage medium of claim 10, the operations further comprising, instantiating a new instance of the containerized application in the second container cluster using the snapshot object and the one or more snapshot data volumes.

16. The computer-readable storage medium of claim 15, wherein instantiating the new instance of the containerized application includes:
   determining the point-in-time copy of the configuration information and the one or more snapshot data volumes using the snapshot object;
   creating at least one of a linked clone or a full clone of each of the one or more snapshot data volumes; and
   deploying the new instance of the containerized application using the determined point-in-time copy of the configuration information and the linked clones or the full clones of the one or more snapshot data volumes.

17. The computer-readable storage medium of claim 10, the operations further comprising validating the received request by:
   identifying a user who made the request; and
   attempting to access the containerized application as the identified user.

18. The computer-readable storage medium of claim 10, wherein the generated snapshot object and the one or more snapshot data volumes are used in at least one of a backup and restore, cloning, disaster recovery, reporting, or analytics operation.

19. A system, comprising:
   a processor; and
   a memory, wherein the memory includes an application program configured to perform operations for copying a containerized application deployed in a first container cluster to a second container cluster, the operations comprising:
      receiving a request to take a snapshot of a containerized application responsive to receiving the request, generating a snapshot object that includes a point-in-time copy of configuration information associated with a state of the containerized application as deployed in the first container cluster;
      taking snapshots of one or more data volumes associated with the containerized application, the one or data volumes stored in a first storage resource;
      adding, to the snapshot object, a respective reference to each of the one or more snapshot data volumes;
      copying the snapshot object to the second container cluster; and
      copying the snapshots of one or more data volumes to a second storage resource associated with the second container cluster.

* * * * *